United States Patent
Miyazaki

(10) Patent No.: US 8,658,729 B2
(45) Date of Patent: Feb. 25, 2014

(54) RUBBER COMPOSITION FOR CANVAS CHAFER AND PNEUMATIC TIRE

(75) Inventor: Tatsuya Miyazaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 249 days.

(21) Appl. No.: 13/217,315

(22) Filed: Aug. 25, 2011

(65) Prior Publication Data

US 2012/0048444 A1    Mar. 1, 2012

(30) Foreign Application Priority Data

Aug. 26, 2010  (JP) .................................. 2010-189328

(51) Int. Cl.
*C08K 3/04*    (2006.01)
*B60C 1/00*    (2006.01)

(52) U.S. Cl.
USPC .......................................... 524/495; 524/526

(58) Field of Classification Search
USPC ....................................................... 524/495
See application file for complete search history.

(56) References Cited

U.S. PATENT DOCUMENTS 7,393,902 B2 *   7/2008   Miyazaki ...................... 525/236
2010/0048799 A1 *   2/2010   Miyazaki et al. ............. 524/526

FOREIGN PATENT DOCUMENTS

JP    2009-127144 A    6/2009

* cited by examiner

*Primary Examiner* — Hui Chin
(74) *Attorney, Agent, or Firm* — Birch, Stewart, Kolasch & Birch, LLP

(57) ABSTRACT

Topping rubber composition for canvas chafer which provides good rim chafing resistance, durability, sheeting processability, and less heat build-up. Topping rubber composition contains a rubber component with: (a) BR containing 2.5-20% by mass of 1,2-syndiotactic polybutadiene crystals, (b) BR having a cis content of 90% by mass or more, and/or (c) tin-modified BR obtained by polymerization with a lithium initiator and having a tin-atom content of 50-3000 ppm, a vinyl-bond content of 5-50% by mass, and a molecular weight distribution of 2 or less. Topping rubber composition also contains carbon black having $N_2SA$ of 65-130 $m^2/g$. Total amount of (a)-(c) is 40-90% by mass per 100% by mass of the rubber component; amount of the carbon black is 50-75 parts by mass per 100 parts by mass of the rubber component. Also, pneumatic tire made with the composition.

3 Claims, No Drawings

RUBBER COMPOSITION FOR CANVAS CHAFER AND PNEUMATIC TIRE

TECHNICAL FIELD

The present invention relates to a rubber composition for a canvas chafer and a pneumatic tire produced using the rubber composition.

BACKGROUND ART

The bead portion of a pneumatic tire includes a chafer for effectively preventing damage (rim chafing) that is caused by abrasion with a rim. As such chafers, canvas chafers have been widely used because of their ability to effectively prevent damage at the time of mounting to a rim and dismounting from a rim.

Canvas chafers mean rubber-topped fabrics. These canvas chafers, however, may develop problems such as exposure of fibers and breakage of a portion of cords if covering rubber compositions of these canvas chafers wear out after traveling. Another problem thereof is higher frequency of cracks in fiber ends or the adjacent rubber composition, which are caused due to remarkably high tensile stress imposed on a portion of fibers in the chafer in the process of rim assembling.

With the aim of improving rim chafing resistance, Patent Document 1 discloses a pneumatic tire for a passenger vehicle including, as a chafer in the bead portion, a cord fabric for tires which is obtained by weaving warp yarns and weft yarns with specific structures. However, there is still a strong need for improved rim chafing resistance of tires, in particular of fuel-efficient tires, which drives a need for further improvement.

Patent Document 1: JP 2009-127144 A

SUMMARY OF THE INVENTION

An object of the present invention is to provide a topping rubber composition for a canvas chafer which is capable of overcoming the above-mentioned problems, provides good rim chafing resistance, high durability, and less heat build-up and has good sheeting processability, and a pneumatic tire produced using the rubber composition.

The present invention relates to a rubber composition for a canvas chafer, which contains:

a rubber component including at least one selected from the group consisting of:

(a) a butadiene rubber containing 2.5 to 20% by mass of 1,2-syndiotactic polybutadiene crystals, (b) a butadiene rubber having a cis content of not less than 90% by mass, and (c) a tin-modified butadiene rubber that is obtained by polymerization with a lithium initiator, and has a tin atom content of 50 to 3000 ppm, a vinyl-bond content of 5 to 50% by mass, and a molecular weight distribution of not more than 2; and a carbon black having a nitrogen adsorption specific surface area of 65 to 130 $m^2/g$, wherein the total amount of the rubbers (a) to (c) is 40 to 90% by mass based on 100% by mass of the rubber component, and the amount of the carbon black is 50 to 75 parts by mass relative to 100 parts by mass of the rubber component.

Preferably, the rubber composition contains 1.6 to 2.7 parts by mass of sulfur relative to 100 parts by mass of the rubber component. In addition, the rubber composition preferably contains natural rubber and/or isoprene rubber.

The present invention also relates to a pneumatic tire including a canvas chafer produced using the rubber composition.

According to the present invention, a rubber composition containing specific butadiene rubber(s) and a carbon black having a predetermined specific surface area is used for a covering rubber composition of a canvas chafer. A pneumatic tire provided with the chafer is excellent in rim chafing resistance and durability and still leads to less heat build-up. In addition, the rubber composition containing the specific components has good processability, in particular, in the process where the composition, after being kneaded and fed to a cold feed extruder, is sheeted (or calendered) into a sheet with a thickness of about 0.5 to 1.0 mm.

BEST MODE FOR CARRYING OUT THE INVENTION

The rubber composition for a canvas chafer of the present invention contains: a rubber component including at least one selected from the group consisting of: (a) a butadiene rubber containing 2.5 to 20% by mass of 1,2-syndiotactic polybutadiene crystals (hereinafter, also referred to as SPB-containing BR), (b) a butadiene rubber having a cis content of not less than 90% by mass (hereinafter, also referred to as high cis BR), and (c) a tin-modified butadiene rubber that is obtained by polymerization with a lithium initiator, and has a tin atom content of 50 to 3000 ppm, a vinyl-bond content of 5 to 50% by mass, and a molecular weight distribution of not more than 2 (hereinafter, also referred to as tin-modified BR); and a carbon black having a predetermined nitrogen adsorption specific surface area ($N_2SA$).

A canvas chafer is located in a bead seating area (bead base area). Although the bead may chafe against a rim so that the canvas chafer may be worn down, in particular in the case of sudden acceleration or sudden deceleration, the use of predetermined amounts of the rubbers (a) to (c) and carbon black for the topping rubber composition remarkably improves the rim chafing resistance of the canvas chafer and prevents such wearing down during traveling. As a result, high durability can be achieved. In addition, the rubber composition of the present invention used for the canvas chafer produces a more pronounced effect of improving the rim chafing resistance, especially at a bead seating area (lower part of the bead area) compared with when the rubber composition is used for a rubber chafer. The reason for this seems to be as follows. The rubber chafer has a structure with a larger proportion of a rubber composition, and therefore is pressed against a rim with a wider distribution and lower levels of pressure because when the rubber chafer is compressed by bead wires and the rim, the rubber composition escapes to the surrounding area. In contrast, the canvas chafer has a structure with a smaller proportion of a rubber composition below bead wires and therefore is pressed with a narrower distribution and higher levels of pressure.

In addition, for the canvas chafer, the adhesion does not particularly matter because the canvas chafer is tightly compressed between the rim and the bead wires during loaded rotation of a tire, and is therefore sufficiently prevented from moving. Further, the above components provide good sheeting processability (processability in the process of feeding an unvulcanized rubber composition to a cold feed extruder to form a sheet with a thickness of about 0.5 to 1.0 mm (e.g. flatness of the sheet surface, irregularities along the outer edge of the sheet)) and lead to less heat build-up.

Additionally, the use of a predetermined amount of sulfur in addition to the above components provides good tensile strength and adhesion to fibers to the canvas chafer. In turn, high degradation resistance can be achieved.

The SPB-containing BR may be one widely used in the tire industry and is preferably one that contains 1,2-syndiotactic polybutadiene crystals chemically bonded to and dispersed in BR. The 1,2-syndiotactic polybutadiene crystals therein provide a sufficient complex elastic modulus and improve the rim chafing resistance and abrasion resistance.

The melting point of the 1,2-syndiotactic polybutadiene crystals is preferably not lower than 180° C. and more preferably not lower than 190° C. If the melting point is lower than 180° C., the 1,2-syndiotactic polybutadiene crystals may melt in the rubber kneading process, resulting in lower hardness and rim chafing resistance. The melting point is preferably not higher than 220° C. and more preferably not higher than 210° C. If the melting point is higher than 220° C., the dispersibility in the rubber composition tends to be lower.

The amount of the 1,2-syndiotactic polybutadiene crystals in the SPB-containing BR is not less than 2.5% by mass and is preferably not less than 10% by mass. An amount of less than 2.5% by mass may result in insufficient rim chafing resistance and hardness. The amount of the 1,2-syndiotactic polybutadiene crystals is not more than 20% by mass and is preferably not more than 18% by mass. An amount of more than 20% by mass may cause difficulty in dispersion of this BR in the rubber composition, and therefore tends to reduce the processability.

The high cis BR is a BR with a cis content (cis 1,4-bond content of the butadiene moieties of the rubber) of not less than 90% by mass. The cis content is preferably not less than 95% by mass and more preferably not less than 97% by mass.

Here, the cis content can be determined by infrared absorption spectrum analysis.

The tin-modified BR (c) is one obtained by polymerizing 1,3-butadiene with a lithium initiator and adding a tin compound to the resulting product, and preferably has a tin-carbon bond at the molecular end.

Examples of the lithium initiator include lithium compounds such as alkyllithium, aryllithium, allyllithium, vinyl-lithium, organotin-lithium, and organonitrogen-lithium compounds. The use of a lithium compound as the initiator for BR provides a tin-modified BR with a high vinyl content and a low cis content.

Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene.

The tin atom content of the tin-modified BR is not less than 50 ppm, and is preferably not less than 60 ppm. A content of less than 50 ppm tends to result in a smaller effect of improving carbon black dispersion. The tin atom content is not more than 3000 ppm, and is preferably not more than 2500 ppm, and more preferably not more than 250 ppm. A content of more than 3000 ppm tends to produce a kneaded mixture that is less likely to be combined so as to have a regular edge, resulting in lower extrusion processability of the kneaded mixture.

The molecular weight distribution (Mw/Mn) of the tin-modified BR is not more than 2, and is preferably not more than 1.5. A Mw/Mn of more than 2 tends to reduce the dispersibility of carbon black and increase tan δ. The lower limit of the molecular weight distribution is not particularly limited, but is preferably not less than 1.

Here, Mw and Mn can be determined by using a device of GPC-8000 series (produced by Tosoh Corporation, detector: differential refractometer) and calibration with polystyrene standards.

For higher productivity of the tin-modified BR, the vinyl-bond content of the tin-modified BR is preferably not less than 5% by mass and more preferably not less than 7% by mass. For higher rim chafing resistance, the vinyl-bond content is preferably not more than 50% by mass and more preferably not more than 20% by mass.

Here, the vinyl-bond content can be determined by infrared absorption spectrum analysis.

For higher rim chafing resistance, the SPE-containing BR and high cis BR are preferable, and SPB-containing BR is particularly preferable among the rubbers (a) to (c). Also, the SPB-containing BR is preferable because SPB particles are oriented in the sheeting direction and this orientation allows the rubber composition to be smoothly sheeted (provides good sheeting processability). In terms of less heat build-up, the tin-modified BR is preferable.

Examples of commercial products of the SPB-containing BR (a) include VCR-303, 412 and 617 (all produced by Ube Industries, Ltd.). Examples of commercial products of the high cis BR (b) include BR130B and BR150B (both produced by Ube Industries, Ltd.). Examples of the tin-modified BR (c) include BR1250H (produced by Zeon Corporation).

For higher rim damage resistance (resistance against rubber chipping upon mounting to a rim and dismounting from a rim) and hardness, the total amount of the SPB-containing BR, high cis BR and tin-modified BR is not less than 40% by mass, and is more preferably not less than 50% by mass, and further more preferably not less than 60% by mass, based on 100% by mass of the rubber component of the rubber composition. The total amount is not more than 90% by mass, is preferably not more than 85% by mass, and more preferably not more than 80% by mass. An amount of more than 90% by mass may reduce the elongation at break and also may fail to improve the processability in the case of using NR and/or IR.

Examples of usable rubbers other than the above rubbers (a) to (c) include diene rubbers such as natural rubber (NR), isoprene rubber (IR), styrene-butadiene rubber (SBR), and epoxidized natural rubber (ENR). Particularly, NR and IR are preferable because they provide higher processability and tensile strength, and in turn provide higher durability.

The NR is not particularly limited and may be one commonly used in the rubber industry. Specific examples thereof include RSS#3 and TSR 20. The IR is also not particularly limited and may be one conventionally known in the tire industry.

In the rubber composition, the total amount of NR and IR is preferably not less than 10% by mass, and more preferably not less than 15% by mass, based on 100% by mass of the rubber component. A total amount of less than 10% by mass may lead to a decrease in the elongation at break and processability. The total amount is preferably not more than 60% by mass, and more preferably not more than 50% by mass, based on 100% by mass of the rubber component. A total amount of more than 60% by mass may reduce the rim chafing resistance.

In the present invention, a carbon black having an $N_2SA$ of 65 to 130 $m^2/g$ is used. An $N_2SA$ of less than 65 $m^2/g$ may lead to lower rim chafing resistance and tensile strength, and therefore tends to result in lower durability. An $N_2SA$ of more than 130 $m^2/g$ tends to lead to lower processability and higher tan δ. The lower limit of the $N_2SA$ is preferably 68 $m^2/g$ and more preferably 70 $m^2/g$, and the upper limit thereof is preferably 125 $m^2/g$ and more preferably 120 $m^2/g$.

In terms of rim chafing resistance, tensile strength, durability and heat build-up, the carbon black (B) is preferably N351H, N220, N330 or N219, and particularly preferably N351H or N220.

For higher rim chafing resistance, hardness and durability, the amount of the carbon black is not less than 50 parts by mass, and is preferably not less than 55 parts by mass, and more preferably not less than 60 parts by mass, relative to 100 parts by mass of the rubber component. For prevention of an increase in tan δ, the amount of the carbon black is not more than 75 parts by mass, and is preferably not more than 73 parts by mass, and more preferably not more than 70 parts by mass, relative to 100 parts by mass of the rubber component.

In the present invention, silica may be further used as a filler since it improves the elongation at break without affecting the rim chafing resistance, and leads to less heat build-up.

For higher tensile strength, the amount of silica is preferably not less than 5 parts by mass and more preferably not less than 7 parts by mass, relative to 100 parts by mass of the rubber component. For good rim chafing resistance, the amount of silica is preferably not more than 15 parts by mass and more preferably not more than 13 parts by mass.

In the case of using silica, it is preferable to further use a known silane coupling agent in order to improve the processability and accelerate dispersion of silica.

The rubber composition of the present invention preferably contains sulfur. As the sulfur, insoluble sulfur commonly used in the rubber industry is suitably used.

For good tensile strength and adhesion to fibers, the amount of sulfur is preferably not less than 1.6 parts by mass and more preferably not less than 1.7 parts by mass, relative to 100 parts by mass of the rubber component. For improved degradation resistance, the amount of sulfur is preferably not more than 2.7 parts by mass and more preferably not more than 2.5 parts by mass, relative to 100 parts by mass of the rubber component. In the case of using insoluble sulfur as the sulfur, "the amount of sulfur" means the amount of pure sulfur therein without oil.

For properties such as adhesion, at least one compound selected from the group consisting of resorcin resins (condensates), modified resorcin resins (condensates), cresol resins and modified cresol resins is occasionally used with a methylene donor for rubber compositions for chafers. The rubber composition of the present invention, however, may not contain these ingredients. This is because bead wires effectively fasten the canvas chafer so as to sufficiently prevent the canvas chafer from moving even during loaded rotation of a tire.

The rubber composition of the present invention may optionally contain additives that are commonly used in the rubber industry, in addition to the above ingredients. Examples of the additives include zinc oxide, antioxidants of any types, softeners and vulcanization accelerators of any types.

The rubber composition of the present invention is produced by a usual production method, specifically, for example, by kneading the above ingredients with a kneading apparatus such as a Banbury mixer, a kneader, or an open roll mill, and then vulcanizing the mixture.

The rubber composition of the present invention can be used as a topping (covering) rubber composition for a canvas chafer.

The rubber composition of the present invention is used for a topping rubber composition of a canvas chafer that consists of a fabric and the topping rubber composition covering the fabric, is located around a bead and is in contact with a rim when assembled with the rim. Specifically, the rubber composition can be used for a canvas chafer such as those disclosed in FIGS. 1 to 6 of JP 2010-52486 A, FIGS. 1 and 2 of JP 2009-127144 A, FIGS. 1 and 5 of JP 2009-160952 A, and FIGS. 1 and 2 of JP 2007-238078A. The fabric of a canvas chafer is commonly formed from a large number of warp yarns and weft yarns. The warp yarns and weft yarns are made of organic fibers, and preferred examples of organic fibers include polyester fibers, polyethylene naphthalate fibers and polyamide fibers (e.g. nylon fibers, aramid fibers).

The pneumatic tire of the present invention can be produced by a usual method using the above rubber composition, specifically as follows.

Sheets formed from the rubber composition containing the above components are set to sandwich a fabric and then compressed with rolls from above and below to provide a rubberized sheet. The rubberized sheet thus obtained is cut into a predetermined size and the cut piece is assembled with other tire components on a tire building machine by a usual method so as to form an unvulcanized tire. Then, the unvulcanized tire is heated and pressurized in a vulcanizer to provide a tire.

The pneumatic tire of the present invention is suitably used for passenger vehicles, commercial vehicles (light trucks), tracks and buses, industrial vehicles and the like, and is particularly suitable for passenger vehicles and commercial vehicles.

EXAMPLES

The following will mention the present invention specifically with reference to Examples, but the present invention is not limited thereto.

The chemical agents used in Examples and Comparative Examples are listed below.

NR: TSR20

IR: IR2200 (JSR Corporation)

SPB-containing BR: VCR617 (Ube Industries, Ltd., 1,2-syndiotactic polybutadiene crystal dispersion, 1,2-syndiotactic polybutadiene crystal content: 17% by mass, melting point of 1,2-syndiotactic polybutadiene crystals: 200° C.)

High cis BR: BR150B (Ube Industries, Ltd., cis content: 97% by mass)

Tin-modified BR: BR1250H (Zeon Corporation, produced using lithium as initiator, vinyl-bond content: 10 to 13% by mass, Mw/Mn: 1.5, tin atom content: 250 ppm)

Emulsion-polymerized styrene-butadiene rubber (E-SBR): SBR1502 (JSR Corporation, styrene unit content: 23.5% by mass)

Modified SBR: HPR340 (JSR Corporation, modified S-SBR, bound-styrene content: 10% by mass, terminally bonded to alkoxysilane)

Silica: Ultrasil VN3 (Degussa, $N_2SA$: 210 $m^2/g$)

Carbon black N550: N550 (Cabot Japan K.K., $N_2SA$: 53 $m^2/g$)

Carbon black N351H: N351H (Cabot Japan K.K., $N_2SA$: 72 $m^2/g$)

Carbon black N220: N220 (Cabot Japan K.K., $N_2SA$: 118 $m^2/g$)

Carbon black N110: N110 (Cabot Japan K.K., $N_2SA$: 139 $m^2/g$)

Softener: TDAE oil (Japan Energy Corporation)

Antioxidant: FLECTOL TMQ (FLEXSYS)

Stearic acid: Stearic acid (NOF Corporation)

Zinc oxide: Zinc oxide #1 (Mitsui Mining & Smelting Co., Ltd.)

Si266: Bis(3-triethoxysilylpropyl)disulfide (Degussa)

Insoluble sulfur (oil content: 10%): SEIMI sulfur (Nippon Kanryu Industry Co., Ltd., insoluble sulfur with carbon disulfide-insoluble content of 60% or higher, oil content: 10% by mass)

Vulcanization accelerator TBBS: NOCCELER NS (Ouchi Shinko Chemical Industrial Co., Ltd., N-tert-buthyl-2-benzothiazolylsulfenamide)

Modified resorcin condensate: Sumikanol 620 (Sumitomo Chemical Co., Ltd., resorcin-alkylphenol-formalin copolymer)

Methylene donor: Sumikanol 507A (Sumitomo Chemical Co., Ltd., mixture containing about 65% by mass of methylol melamine resin, and about 35% by mass of silica and oil)

Examples and Comparative Examples

The chemical agents in amounts shown in Table 1 or 2, except the sulfur, vulcanization accelerator TBBS and methylene donor, were kneaded with a Banbury mixer. To the kneaded mixture were added the sulfur, vulcanization accelerator TBBS and methylene donor, and then the resulting mixture was kneaded with an open roll mill into an unvulcanized rubber composition.

A portion of the unvulcanized rubber composition was vulcanized at 170° C. for 12 minutes into a vulcanized rubber composition.

Another portion of the unvulcanized rubber composition was extruded from an extruder with a mouth ring of a predetermined shape and thereby formed into 0.5-mm-thick rubber sheets. The obtained rubber sheets were set on the both faces of a canvas chafer fabric and then compressed with rolls. The obtained sheet was cut into a canvas chafer shape. Subsequently, the canvas chafer thus obtained was assembled with other tire components on a tire building machine in a usual manner to provide a raw cover (unvulcanized tire). The raw cover was vulcanized with steam at 170° C. at 25 kgf/cm$^2$ in a mold to provide a test tire (tire size: 215/45R17, tire for passenger vehicles).

<Rubber Hardness (Hs)>

The hardness of each vulcanized rubber composition was determined with a JIS-A hardness tester.

<Viscoelasticity Test>

The loss tangent (tan δ) of each vulcanized rubber composition was measured at 70° C. using a viscoelasticity spectrometer (Iwamoto Seisakusho Co., Ltd.) under conditions of: 10% in initial strain; 2% in dynamic strain; and 10 Hz in frequency. A smaller tan δ corresponds to less heat build-up.

<Rim Chafing Resistance Test>

The test tires ran on a drum at 20 km/h for 600 hours under a 230% load of the maximum load (maximum internal pressure conditions) of the JIS standard, and then the wear depth in a bead seating area was measured for each tire. The rim chafing resistance index of Example 1 was regarded as 100, and the wear depth of each composition was expressed as an index calculated by the following equation. A larger rim chafing resistance index corresponds to less rim slippage and less wear amount (better rim chafing resistance).

(Rim chafing resistance index)=(Wear depth of Example 1)/(Wear depth of each composition)×100

<Sheeting Processability>

A portion of each unvulcanized rubber composition was fed to a cold feed extruder and extruded under a condition to form a sheet with a size of 0.5 mm in thickness×about 2 m in width. The obtained sheet was visually observed and evaluated on a 0 to 6 scale for the flatness of the sheet surface and irregularities along the outer edge of the sheet. The sheeting processability is susceptible to the scorch, homogeneity and orientation conditions of the rubber composition. A scale of 3 or higher indicates secured practical processability.

TABLE 1

|   |   |   | Examples |   |   |   |   |   |   |
|---|---|---|---|---|---|---|---|---|---|
|   |   |   | 1 | 2 | 3 | 4 | 5 | 6 | 7 |
| Components (parts by mass) | NR or IR | | 40 | 40 | 40 | 40 | 40 | 40 | 40 |
|   | SPB-containing BR (VCR617) | | — | 60 | — | — | — | — | — |
|   | High cis BR (BR150B) | | 60 | — | 60 | 60 | 60 | 60 | 60 |
|   | Tin-modified BR(BR1250H) | | — | — | — | — | — | — | — |
|   | E-SBR (SBR1502) | | — | — | — | — | — | — | — |
|   | Modified SBR (HPR340) | | — | — | — | — | — | — | — |
|   | Silica (VN3) | | — | — | — | 10 | — | — | — |
|   | Carbon black | N550 (53 m$^2$/g) | — | — | — | — | — | — | — |
|   |   | N351H (72 m$^2$/g) | 65 | 62 | — | 55 | 65 | — | 72 |
|   |   | N220 (118 m$^2$/g) | — | — | 65 | — | — | 57 | — |
|   |   | N110 (139 m$^2$/g) | — | — | — | — | — | — | — |
|   | Softener (TDAE oil) | | 5 | 5 | 5 | 5 | 5 | 5 | 5 |
|   | Antioxidant (TMQ) | | 1 | 1 | 1 | 1 | 1 | 1 | 1 |
|   | Stearic acid | | 2 | 2 | 2 | 2 | 2 | 2 | 2 |
|   | Zinc oxide | | 4 | 4 | 4 | 4 | 1.2 | 4 | 4 |
|   | Si266 | | — | — | — | 0.1 | — | — | — |
|   | Insoluble sulfur (oil content: 10%) | | 2 | 2 | 2 | 2 | 2 | 2 | 2 |
|   | Vulcanization accelerator TBBS | | 2.3 | 2.3 | 2.3 | 2.3 | 3.1 | 2.3 | 2.3 |
|   | Modified resorcin condensate (Sumikanol 620) | | — | — | — | — | — | — | — |
|   | Methylene donor (Sumikanol 507A) | | — | — | — | — | — | — | — |
| Evaluation | Hardness (Hs @RT) | | 68 | 68 | 71 | 66 | 68 | 68 | 72 |
|   | Heat build-up (tanδ 70° C.) | | 0.13 | 0.12 | 0.19 | 0.115 | 0.12 | 0.14 | 0.18 |
|   | Rim chafing resistance index | | 100 | 120 | 110 | 95 | 107 | 95 | 100 |
|   | Sheeting processability | | 4 | 5 | 3 | 4 | 3 | 4 | 3 |

TABLE 1-continued

| | | Examples | | | | | |
|---|---|---|---|---|---|---|---|
| | | 8 | 9 | 10 | 11 | 12 | 13 |
| Components (parts by mass) | NR or IR | 55 | 20 | 40 | 40 | 30 | 40 |
| | SPB-containing BR (VCR617) | — | — | 35 | 35 | 50 | — |
| | High cis BR (BR150B) | 45 | 80 | — | — | — | 60 |
| | Tin-modified BR(BR1250H) | — | — | 25 | 25 | — | — |
| | E-SBR (SBR1502) | — | — | — | — | — | — |
| | Modified SBR (HPR340) | — | — | — | — | 20 | — |
| | Silica (VN3) | — | — | — | 10 | — | — |
| | Carbon black N550 (53 $m^2$/g) | — | — | — | — | — | — |
| | N351H (72 $m^2$/g) | 65 | 65 | 65 | — | 62 | 65 |
| | N220 (118 $m^2$/g) | — | — | — | 55 | — | — |
| | N110 (139 $m^2$/g) | — | — | — | — | — | — |
| | Softener (TDAE oil) | 5 | 5 | 5 | 5 | 5 | 5 |
| | Antioxidant (TMQ) | 1 | 1 | 1 | 1 | 1 | 1 |
| | Stearic acid | 2 | 2 | 2 | 2 | 2 | 2 |
| | Zinc oxide | 4 | 4 | 4 | 4 | 4 | 4 |
| | Si266 | — | — | — | — | — | — |
| | Insoluble sulfur (oil content: 10%) | 2 | 2 | 2 | 2 | 2 | 3.3 |
| | Vulcanization accelerator TBBS | 2.3 | 2.3 | 2.3 | 2.3 | 2.3 | 1.0 |
| | Modified resorcin condensate (Sumikanol 620) | — | — | — | — | — | — |
| | Methylene donor (Sumikanol 507A) | — | — | — | — | — | — |
| Evaluation | Hardness (Hs @RT) | 68 | 68 | 68 | 69 | 69 | 70 |
| | Heat build-up (tanδ 70° C.) | 0.13 | 0.13 | 0.085 | 0.102 | 0.11 | 0.145 |
| | Rim chafing resistance index | 80 | 120 | 105 | 105 | 105 | 75 |
| | Sheeting processability | 4 | 3 | 4 | 4 | 4 | 4 |

TABLE 2

| | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Components (parts by mass) | NR or IR | 70 | 70 | 60 | 70 | 70 | 70 | 70 | 40 | 40 | 40 | 40 | 40 |
| | SPB-containing BR (VCR617) | — | — | — | — | — | — | — | — | — | — | — | 60 |
| | High cis BR(BR150B) | — | — | 15 | — | — | — | — | 60 | 60 | 60 | 60 | — |
| | Tin-modified BR(BR1250H) | — | — | — | — | — | — | — | — | — | — | — | — |
| | E-SBR (SBR1502) | 30 | 30 | 25 | 30 | 30 | 30 | 30 | — | — | — | — | — |
| | Modified SBR (HPR340) | — | — | — | — | — | — | — | — | — | — | — | — |
| | Silica (VN3) | — | — | — | — | — | — | — | — | — | — | — | 30 |
| | Carbon black N550 (53 $m^2$/g) | — | — | — | — | — | — | — | — | — | 65 | — | — |
| | N351H (72 $m^2$/g) | 45 | 45 | 45 | 55 | 65 | 70 | 77 | 45 | 77 | — | — | 45 |
| | N220 (118 $m^2$/g) | — | — | — | — | — | — | — | — | — | — | — | — |
| | N110 (139 $m^2$/g) | — | — | — | — | — | — | — | — | — | — | 65 | — |
| | Softener (TDAE oil) | 5 | 5 | 5 | 5 | 5 | 5 | 5 | 5 | 5 | 5 | 5 | 5 |
| | Antioxidant (TMQ) | 1 | 1 | 1 | 1 | 1 | 1 | 1 | 1 | 1 | 1 | 1 | 1 |
| | Stearic acid | 2 | 2 | 2 | 2 | 2 | 2 | 2 | 2 | 2 | 2 | 2 | 2 |
| | Zinc oxide | 4 | 4 | 4 | 4 | 4 | 4 | 4 | 4 | 4 | 4 | 4 | 4 |
| | Si266 | — | — | — | — | — | — | — | — | — | — | — | 2.4 |
| | Insoluble sulfur (oil content: 10%) | 2 | 2 | 2 | 2 | 2 | 2 | 2 | 2 | 2 | 2 | 2 | 2 |
| | Vulcanization accelerator TBBS | 2.3 | 2.3 | 2.3 | 2.3 | 2.3 | 2.3 | 2.3 | 2.3 | 2.3 | 2.3 | 2.3 | 2.3 |
| | Modified resorcin condensate (Sumikanol 620) | — | 3 | — | — | — | — | — | — | — | — | — | — |
| | Methylene donor (Sumikanol 507A) | — | 4 | — | — | — | — | — | — | — | — | — | — |
| Evaluation | Hardness (Hs @RT) | 61 | 66 | 61 | 65 | 69 | 74 | 76 | 60 | 74 | 62 | 73 | 66 |
| | Heat build-up (tanδ 70° C.) | 0.095 | 0.12 | 0.095 | 0.12 | 0.15 | 0.17 | 0.202 | 0.11 | 0205 | 0.095 | 024 | 0.102 |
| | Rim chafing resistance index | 30 | 35 | 35 | 45 | 55 | 50 | 45 | 55 | 90 | 45 | 125 | 75 |
| | Sheeting processability | 6 | 5 | 5 | 5 | 3 | 2 | 6 | 1 | 4 | 1 | 3 |

In Examples, the rim chafing resistance could be remarkably improved with sufficiently less heat build-up and good sheeting processability. In particular, the use of the SPB-containing BR resulted in good rim chafing resistance. The use of the SPB-containing BR and tin-modified BR with NR or IR secured good rim chafing resistance and sheeting processability, and also resulted in less heat build-up. In contrast, it was impossible to improve these performances in a balanced manner in Comparative Examples.

From the results of Example 1 (insoluble sulfur: 2 parts (sulfur content: 1.8 parts)) and Example 13 (insoluble sulfur: 3.3 parts (sulfur content: 3.0 parts)), it is apparent that use of sulfur in an amount of 1.6 to 2.7 parts sufficiently improves the rim chafing resistance and provides good degradation resistance. Sulfur in an amount of about 3.0 parts seems to reduce EB due to oxidization degradation, and increase the hardness and crosslink density, which will result in lower rim chafing resistance and more heat build-up.

<Comparison Test of Canvas Chafer and Rubber Chafer (Clinch Rubber)>

Tires of a canvas chafer structure and tires of a rubber chafer structure produced using the rubber composition of Example 1 or Comparative Example 1 were prepared and evaluated for the rim chafing resistance at the bead seating area. The tires of a canvas chafer structure were those produced above, and the tires of a rubber chafer structure were produced in the same manner as that described above, except that the corresponding rubber chafer (clinch rubber) was located instead of the canvas chafer. The rim chafing resistance at the bead seating area was evaluated as follows.

(Rim Chafing Resistance at Bead Seating Area)

The produced test tires ran on a drum at 20 km/h for 400 hours under a 2300 load of the maximum load (maximum internal pressure conditions) of the JIS standard, and then the wear depth in a contact region of the bead seating area was measured for each tire. The rim chafing resistance index of the tire of a canvas chafer structure produced from the composition of Example 1 was regarded as 100, and the wear depth of each tire was expressed as an index calculated by the following equation. A larger rim chafing resistance index corresponds to better rim chafing resistance at the bead seating area.

(Rim chafing resistance index (at bead seating area))= (Wear depth of Example 1)/(Wear depth of each tire)×100

TABLE 3

| Used rubber composition | Rubber chafer structure | | Canvas chafer structure | |
| --- | --- | --- | --- | --- |
| | Comparative Example 1 (without canvas) | Example 1 (without canvas) | Comparative Example 1 (with canvas) | Example 1 (with canvas) |
| Rim chafing resistance index (at bead seating area) | 45 | 85 | 30 | 100 |

A further greater improvement was seen when the composition of Example 1 was used as a material for a tire of a canvas chafer structure instead of the composition of Comparative Example 1 than when the composition of Example 1 was likewise used as a material for a tire of a rubber chafer structure instead of the composition of Comparative Example 1. This result revealed that the use of the rubber composition of the present invention for a canvas chafer provides remarkably improved rim chafing resistance to a bead seating area.

The invention claimed is:

1. A pneumatic tire comprising a canvas chafer produced from a rubber composition for a canvas chafer, said rubber composition comprising:
  a rubber component including at least one rubber selected from the group consisting of:
    (a) a butadiene rubber containing 2.5 to 20% by mass of 1,2-syndiotactic polybutadiene crystals,
    (b) a butadiene rubber having a cis content of not less than 90% by mass, and
    (c) a tin-modified butadiene rubber that is obtained by polymerization with a lithium initiator, and has a tin atom content of 50 to 3000 ppm, a vinyl-bond content of 5 to 50% by mass, and a molecular weight distribution of not more than 2,
  wherein the total amount of the rubbers (a) to (c) is 40 to 90% by mass based on 100% by mass of the rubber component; and
  a carbon black having a nitrogen adsorption specific surface area of 65 to 130 $m^2/g$, wherein the amount of the carbon black is 50 to 75 parts by mass relative to 100 parts by mass of the rubber component.

2. The pneumatic tire according to claim 1, wherein the rubber composition comprises 1.6 to 2.7 parts by mass of sulfur relative to 100 parts by mass of the rubber component.

3. The pneumatic tire according to claim 1, wherein the rubber composition comprises natural rubber and/or isoprene rubber.

* * * * *